United States Patent Office 2,813,786
Patented Nov. 19, 1957

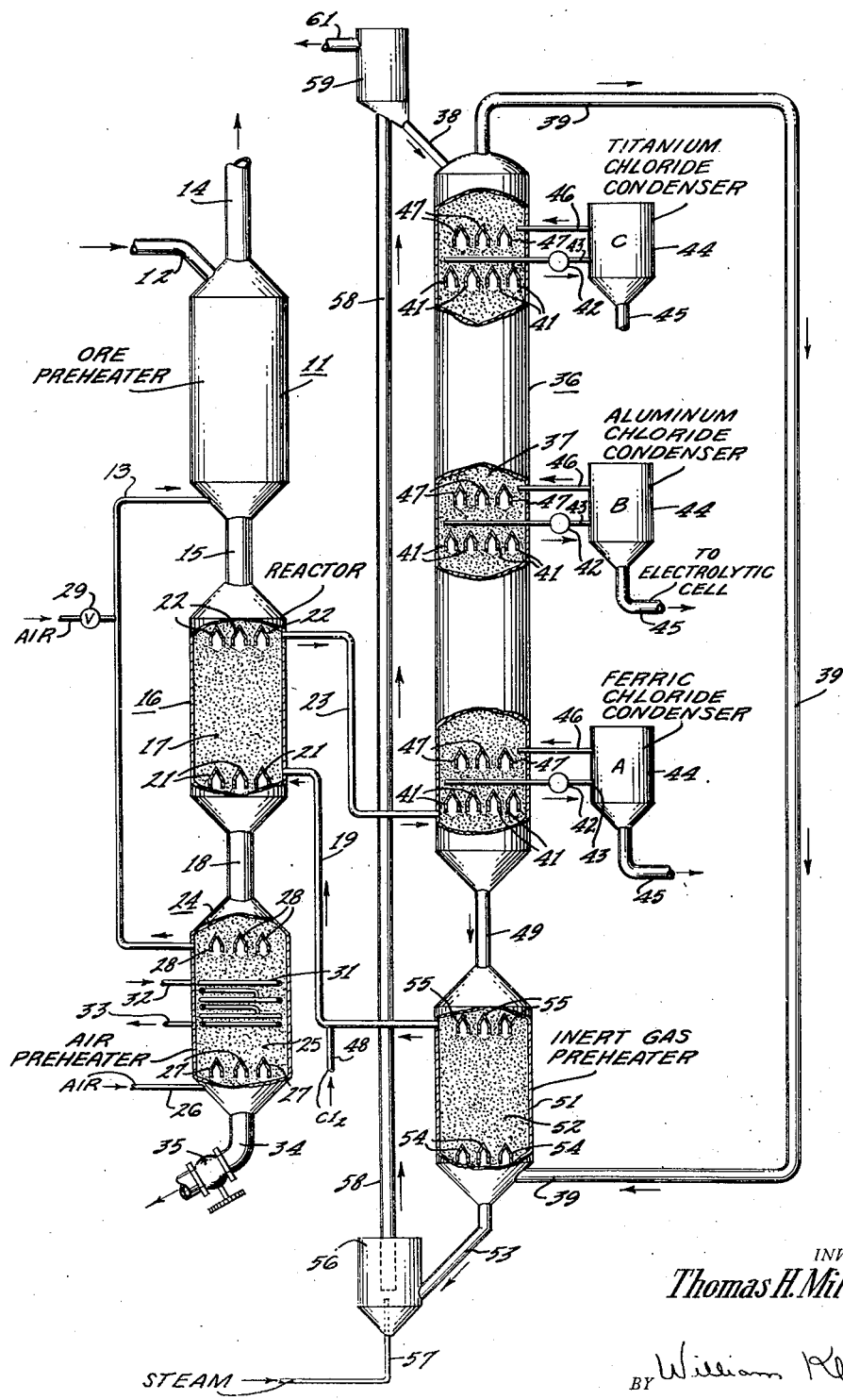

2,813,786

RECOVERY OF METALLIC ALUMINUM FROM ALUMINOUS ORES

Thomas H. Milliken, Jr., Moylan, Pa., assignor to Houdry Process Corporation, Wilmington, Del., a corporation of Delaware Application December 19, 1952, Serial No. 326,873

9 Claims. (Cl. 75—68)

This invention relates to a method and apparatus for obtaining metallic aluminum from clay or other raw materials containing alumina in addition to impurities comprising compounds of materials such as titanium, iron, etc. The invention is especially applicable to materials such as kaolin clay, halloysite, bauxite, etc. having a fairly high alumina content, for example, 45–90% $Al_2O_3$.

In accordance with the invention, pulverized alumina-containing material and carbon, as pellets or briquettes, are preheated with air to an elevated temperature, the gaseous effluent from the resulting combustion, comprising $N_2$, $CO_2$, etc., being separately removed. The heated material is then passed by gravity flow directly to and through a reaction zone wherein it is contacted with a stream comprising an admixture of chlorine and inert gas, the latter, if desired, comprising the gaseous effluent from the preheating step. Within the reaction zone the alumina and the other metallic compounds are halogenated to form the corresponding chlorides, such as aluminum, iron and titanium chlorides. The chlorides, in gaseous form, are removed separately from the reaction zone. The remaining pulverized material, comprising silica etc., is then passed by gravity flow downwardly through one or more heat exchange zones wherein it flows in direct heat exchange with the incoming air stream used in the preheating step, and in indirect heat exchange with water for the recovery of waste heat. The gaseous reaction products comprising the chlorides of aluminum, titanium, iron, etc., and the inert gas are then passed upwardly through an elongated compact gravitating bed of continuously circulating pellets or granules of an inert refractory material of fairly high heat capacity and of high resistance to chloride attack, such as material of the type commonly employed in conventional pebble heaters. The pellets are preferably of a size in the range of about 1/8 to 1/2 inch in diameter, sufficient to provide a substantial resistance to flow of the gaseous material countercurrently through the gravitating compact mass or bed of solids. The temperature gradient upwardly through the bed embraces the temperatures of sublimation of the metal chlorides desired to be extracted, particularly aluminum chloride. At the levels within the bed where the temperatures are slightly, for example about 10° F., above the sublimation temperatures of the various metal chlorides, side streams comprising a portion of the total gaseous material are withdrawn from the bed and passed through condensing zones wherein by temperature reduction the various metal chlorides are removed as solids. The uncondensed portion of the gaseous material so withdrawn is in each instance returned to the bed at a level slightly higher and in a region slightly cooler than that at which it was previously withdrawn, where it rejoins the main stream of gaseous material flowing upwardly through the bed. That portion of the metal chloride remaining in the main stream which would have been condensed had it been a part of the withdrawn stream at a particular level is condensed upon the granular material comprising the bed as soon as it reaches the level where the temperature is below the temperature of sublimation for such portion. The metal chloride condensing upon the gravitating solid particles of refractory material is carried thereby to a lower and hotter region of the bed where the chloride is again vaporized and made part of the main gas stream, thus tending to concentrate the particular component at some zone of the moving bed. At one of the withdrawal levels aluminum chloride is recovered. The metallic aluminum and the chlorine are then electrolytically dissociated, and the recovered chlorine, together with any additional chlorine which may be recovered from the chlorides obtained at the other levels, is recycled to the halogenating zone. At the upper end of the bed, the remaining gaseous material, comprising primarily the inert gas, is disengaged from the cooled refractory material and is thereafter reheated by direct heat exchange with the hot refractory material withdrawn from the bottom of the bed. The reheated inert gas is then combined with the recycle stream of recovered chlorine and is returned in admixture therewith to the halogenating zone. The cooled refractory material discharging from the heat exchange zone is thereafter elevated by known pneumatic or mechanical means and is returned to the top of the moving bed.

For a fuller understanding of the invention, reference may be had to the following description and claims taken in connection with the accompanying drawing forming a part of this application, in which there is diagrammatically illustrated a typical arrangement of apparatus by which the method of the present invention may be carried out.

Referring to the drawing, the numeral 11 designates a preheater vessel into which a mixture of pulverized clay, ore, etc. and carbon as pellets or briquettes is continuously introduced through inlet 12 located at its upper end. Preheated air introduced at the bottom of vessel 11 through conduit 13 ignites the moving mass of pulverized clay and carbon pellets and raises the temperature of the mass to a high level suitable for the subsequent halogenating reaction.

The gaseous combustion products comprising inert material such as nitrogen, carbon dioxide, etc. are discharged from the upper end of vessel 11 through outlet 14, by which they are conveyed to the stack or to other portions of the system, as will hereinafter be explained. The hot granular material, largely comprising silica, is discharged as a compact moving column through seal leg 15 and passed into the upper end of a reactor 16. The pulverized material gravitates as a compact moving bed 17 through the reactor 16 and is discharged at the lower end through seal leg 18.

Within the reactor 16 the pulverized material, comprising compounds of aluminum, titanium, iron, etc. is contacted at elevated temperature with a mixture of chlorine and inert gas introduced at the lower end of the reactor through conduit 19. The mixture of chlorine and inert gas is distributed throughout the lower region of the bed 17 by distributing channels 21, of known design, and passes upwardly through the bed. In the presence of the chlorine, the aluminum, titanium, and iron compounds are converted to form the corresponding chlorides which, at the elevated temperature of the reaction zone, are in the gaseous state.

In the upper region of the reactor bed 17 the gaseous reaction products, including the inert gas, are disengaged from the pulverized material by disengaging channels 22, of known design, and are discharged from the reactor 16 through conduit 23.

The pulverized solid material withdrawn from the reactor 16 through seal leg 18, and comprising principally silica, is passed downwardly by gravity flow as a compact moving column into a waste heat recovery vessel 24 wherein the granular material forms a compact moving bed 25. Air introduced into the bottom of vessel 24 through inlet line 26, and distributed throughout the lower region of bed 25 by distributing channels 27, flows countercurrently through the gravitating bed in direct heat exchange with the granular material, and is disengaged therefrom in the upper region of the bed through disengaging channels 28. The disengaged preheated air is discharged from the vessel 24 into conduit 13, through which it is conveyed into the granular material preheater 11, as previously described. Additional air may be supplied directly to conduit 13 through inlet line 29.

In order to recover additional heat from the hot granular material comprising bed 25, a steam coil 31 is placed within the bed. Water introduced into the coil 31 through inlet line 32 is removed as steam through outlet line 33.

The cooled granular material is discharged from the lower end of vessel 24 through outlet line 34, controlled by valve 35. The flow of granular material through valve 35 is controlled so that a continuous compact moving column of material extends upwardly through vessels 24, 16 and 11 and through their interconnecting seal legs 18 and 15.

The gaseous effluent discharging from the reactor 16 through conduit 23 is passed into the lower end of a fractionator or separator comprising the upright elongated vessel 36. Within the vessel 36 the gaseous reaction products flow upwardly, countercurrent to a compact gravitating bed or column 37 of solid particles of refractory material, preferably in the form of pebbles, continuously introduced into the upper end of vessel 36 through inlet conduit or seal leg 38. The gaseous material is introduced into fractionator 36 from conduit 23 at a temperature well above the boiling or sublimation point of the metal chloride of highest boiling point in the mixture, and is discharged from the upper end thereof through outlet conduit 39 at a temperature well below the boiling point of the metal chloride of lowest boiling point in the mixture, the moving bed providing a temperature gradient throughout its length.

At each of a plurality of preselected longitudinally spaced levels within the elongated bed 37 a portion of the total gaseous maetrial passing said level is disengaged from the bed through disengaging channels 41 and is passed by means of pump 42 through outlet conduit 43 to a condenser 44. Within each condenser 44 the temperature of the gaseous material is lowered slightly so as to condense that one of the metal chlorides whose temperature of sublimation corresponds to the temperature level therein. The condensed metal chloride crystals or powder settles to the bottom of the condenser vessel 44 and is continuously removed, as through outlet lines 45.

The uncondensed gaseous material within condenser 44 is discharged at the upper end thereof into return conduit 46, through which it is forced by the action of pump 42 back into fractionating tower 36. The returned gaseous material is distributed throughout the cross-sectional area of bed 36 by distributing channels 47 located at a level within the bed spaced a relatively short distance above the disengaging channels 41 through which the side stream of gaseous material was previously withdrawn from the bed.

In the particular embodiment of the invention illustrated in the drawing, three metal chloride extracting zones A, B and C are provided, each located at a temperature level along the fractionating tower 36 suitable for the condensation and removal of a particular chloride. For example, at the lowermost level A ferric chloride, which has the highest sublimation temperature, is extracted; at the middle level B aluminum chloride, which has an intermediate sublimation temperature, is extracted; and, at the uppermost level C titanium chloride, which has the lowest sublimation temperature, is extracted. If other metals are present in the original ore, and have been halogenated to the corresponding chlorides in reactor 16, they may be removed at other levels along the fractionating tower 36, provided that their temperatures of sublimation are sufficiently spaced in the overall temperature gradient to overcome the mechanical problems involved in too close vertical spacing of the disengaging and distributing members. This may be overcome to some extent by using a bed of small cross section, and using higher pellet and gas flow rates, thus spreading the temperature gradient along the vertical axis of the moving bed.

Since the invention is directed primarily to the recovery of metallic aluminum, reference will be made only to the subsequent disposition of the aluminum chloride. The aluminum chloride withdrawn from zone B through discharge conduit 45 is conveyed thereby to an electrolytic cell of conventional type, not shown, wherein the metallic aluminum and the chlorine are separated by electrolysis. The metallic aluminum is recovered, and the chlorine is recycled to the reactor 16 by being passed through conduit 48 to the inlet conduit 19 conveying the mixture of chlorine and inert gas to the reactor 16. Alternatively, the chlorides may be burned in air at relatively high temperatures to give the metal oxides and chlorine. Or hydrochloric acid may be recovered by high temperature treatment with steam. The hydrochloric acid would be just as effective as chlorine for removal of metals as chlorides.

The pebbles comprising compact moving bed 37 are continuously withdrawn from the bottom of fractionator 36 and passed as a compact moving stream through seal leg 49 into the upper end of the inert gas preheater 51. The pebbles, now at their maximum temperature by reason of their having just previously been contacted with the hot gaseous material introduced at the bottom of vessel 36, are deposited directly onto the surface of a compact moving bed 52 which gravitates through vessel 51 and is discharged at the lower end thereof through seal leg 53.

The inert gaseous effluent discharging from the upper end of fractionator 36 is conveyed by conduit 39 into the bottom of preheater 51. The inert gas, which has been substantially reduced in temperature by passing through vessel 36, is distributed by channel members 54 throughout the lower cross-sectional area of bed 52. The inert gas flows countercurrently through the gravitating bed and is disengaged from the pebbles in the upper region thereof through channel members 55. The heated disengaged inert gaseous material is discharged from vessel 51 into reactor inlet conduit 19 at a point forward of the point of chlorine introduction from conduit 48.

The pebbles discharged from inert gas preheater 51 through seal leg 53 are introduced into the engaging hopper 56 of a pneumatic lift, wherein the pebbles are engaged with inert lift gas, such as steam, supplied thereto through inlet conduit 57 and conveyed upwardly through a lift pipe 58 to a disengaging hopper 59 surrounding the upper end of the fractionating tower 36. The separated lift gas is discharged to the atmosphere through outlet 61.

While the pebbles have been illustrated and described as being continuously circulated through the action of a pneumatic lift, it is to be understood that other forms of conveyance, such as a bucket elevator, may be employed for such purpose in accordance with the invention.

In a typical operation of the system in accordance with the method of the invention, the raw clay or other ore from which metallic aluminum is to be extracted is preheated in vessel 11 to a temperature in the range of about 1200–1600° F. Without substantial reduction in temperature the preheated ore is introduced into the reactor 16. The temperature within the reactor will depend upon the composition of the particular ore and nature of the reactions taking place therein. Some of the halogenating reactions may, for example, be endothermic while others are exothermic. On the whole, however, it is considered that the net heat effect will be endothermic, so that the temperature of the effluent gases may be in the order of about 1000–1400° F. Without substantial reduction in temperature the gaseous effluent from the reactor, comprising the chlorides of the various metals present in the ore, is introduced into the bottom of the fractionator 36.

The temperature gradient through the fractionator is such that the inert gaseous effluent therefrom is at a temperature in the order of about 180–200° F., at which temperature the inert gas is introduced into the preheater vessel 51. The inert gas is preheated to a temperature of about 800–1200° F. and is thereafter admixed with the stream of chlorine from the electrolytic cell. The chlorine is at a substantially lower temperature but is insufficient in amount to effect any great reduction in the temperature of the admixture.

At zone A, which is approximately the 600° F. level within the fractionator, a portion of the gas is removed and passed to the ferric chloride condenser 44 wherein the temperature is lowered to the point where the ferric chloride sublimes to crystallin form. At slightly reduced temperature, in the order of about 590° F., the uncondensed withdrawn gaseous material is returned to the fractionator. At zone B, which is approximately the 350° F. level, the operation is repeated to condense out crystals of aluminum chloride. At zone C, which is approximately the 275° F. level, the operation is again repeated to extract crystals of titanium chloride. In each condenser it is contemplated that a temperature reduction of approximately 10° F. will be sufficient to effect the desired condensation. However, a further temperature reduction may be made if necessary.

The gaseous discharge from the top of the fractionating tower 36 is at a temperature in the order of about 180–200° F., at substantially which temperature it is introduced to the inert gas preheater 51 for direct heat exchange with the hot pebbles withdrawn from the bottom of the tower.

Obviously many modifications and variations of the invention as hereinbefore set forth may be made without departing from the spirit and scope thereof, and therefore only such limitations should be imposed as are indicated in the appended claims.

What is claimed is:

1. A process for recovering metallic aluminum from a gaseous mixture of inert gas and metallic chlorides obtained by the chloridization of alumina-rich ores in the presence of inert gas which comprises the steps of: removing from said gaseous mixture all metallic chlorides having a condensation temperature higher than the condensation temperature of said aluminum chloride passing the remaining gaseous mixture countercurrently through a confined compact moving column of granular refractory material of high heat capacity, said column having a temperature gradient including the sublimation and condensation temperature of aluminum chloride; withdrawing gaseous material from said column at a level therein where the temperature is slightly higher than said condensation temperature; reducing the temperature of said withdrawn gaseous material to condense aluminum chloride therefrom; returning the uncondensed gaseous material, including remaining uncondensed aluminum chloride, to said column at a level where the temperature is slightly lower than said condensation temperature, whereby the remaining gaseous aluminum chloride is condensed during its further upward movement through said column and is conveyed downwardly in solid state with said granular refractory material to and below said withdrawal level whereat the temperature is such as to effect a resublimation of the solid aluminum chloride; removing from the remaining portion of said uncondensed gaseous material all remaining metallic chloride; reheating the remaining inert gaseous material; recovering metallic aluminum and chlorine from said condensed aluminum chloride; and combining said recovered chlorine with said reheated inert gas for reuse in said chloridization.

2. The method as in claim 1 characterized in that the removal of all additional chlorides having condensation temperatures both higher and lower than the condensation temperature of aluminum chloride is effected in a manner similar to that involved in the condensation of aluminum chloride by withdrawal of gaseous material at levels within said column respectively below and above said first-mentioned level.

3. The method as in claim 2 characterized in that said additional chlorides removed from said column comprise ferric chloride removed from gas withdrawn at a lower level and titanium chloride removed from gas withdrawn at a higher level relative to said level of withdrawal for recovery of aluminum chloride.

4. A method as in claim 1, in which said granular refractory material is continuously withdrawn from the lower end of said compact moving column and is elevated to the upper end thereof.

5. A method as in claim 4 including the step of cooling said withdrawn granular material and reheating said remaining inert gaseous material by indirect heat exchange before returning said granular material to said column and before admixing said inert gas with said recovered chlorine.

6. A method as in claim 5, wherein said granular material is elevated pneumatically to maintain continuous circulation thereof.

7. A method as in claim 1, wherein a similar withdrawal of fractional streams of gaseous material, condensation, and return of uncondensed gaseous material is effected at other temperature levels along said column, for recovery additionally of other metallic components of said gaseous mixture.

8. Apparatus for separately recovering metallic chlorides from a gaseous mixture of chloridized metal components comprising: an upright elongated vessel adapted to contain a compact moving column of granular refractory material; means for introducing said gaseous mixture into the bottom region of said column; means for discharging gaseous material at the top of said vessel; inlet and outlet means for said granular material respectively at the upper and lower ends of said vessel; controllable gas withdrawal means at a plurality of intermediate levels within said vessel; separate condensers individual to said gas withdrawal means each adapted to recover by condensation from withdrawn gaseous material one of said metallic chlorides; and gas introduction means above and relatively close to each of said gas withdrawal means adapted to reintroduce into said vessel uncondensed gaseous material from said condensers.

9. Apparatus as defined in claim 8, including means, associated with each of said gas withdrawal means and said gas introduction means, for effecting withdrawal and reintroduction of gaseous material throughout the horizontal cross section of said moving column.

References Cited in the file of this patent

UNITED STATES PATENTS

| 1,296,575 | Weaver | Mar. 4, 1919 |
| 1,730,891 | Leslie et al. | Oct. 8, 1929 |
| 2,020,431 | Osborne | Nov. 12, 1935 |
| 2,070,161 | Flinn | Feb. 9, 1937 |
| 2,266,359 | Edwards et al. | Dec. 16, 1941 |
| 2,387,228 | Arnold | Oct. 23, 1945 |
| 2,446,221 | Ferguson | Aug. 3, 1948 |
| 2,470,305 | Gross | May 17, 1949 |
| 2,580,635 | Winter | Jan. 1, 1952 |
| 2,701,181 | Kilpatrick | Feb. 1, 1955 |